United States Patent
Pepin

(10) Patent No.: US 6,320,611 B1
(45) Date of Patent: Nov. 20, 2001

(54) METHOD AND DEVICE FOR AIR-GROUND RECOGNITION FOR OPTOELECTRONIC EQUIPMENT

(75) Inventor: Christian Pepin, Gif sur Yvette (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/147,708

(22) PCT Filed: Aug. 19, 1997

(86) PCT No.: PCT/FR97/01501

§ 371 Date: Feb. 22, 1999

§ 102(e) Date: Feb. 22, 1999

(87) PCT Pub. No.: WO98/08193

PCT Pub. Date: Feb. 26, 1998

(30) Foreign Application Priority Data

Aug. 23, 1996 (FR) .................................................. 96 10402

(51) Int. Cl.$^7$ ...................................................... H04N 7/18
(52) U.S. Cl. ............................ 348/147; 348/36; 348/218; 701/223
(58) Field of Search .................................... 348/144, 145, 348/146, 147, 218, 36, 37, 38, 39; 701/223; H04N 7/18

(56) References Cited

U.S. PATENT DOCUMENTS

| | | | |
|---|---|---|---|
| 3,974,331 | 8/1976 | Pepin | 348/317 |
| 4,191,967 | 3/1980 | Dansac et al. | 348/143 |
| 4,363,034 | 12/1982 | Grancoin et al. | 348/298 |
| 4,380,028 | 4/1983 | Pepin et al. | 348/327 |
| 4,404,592 | 9/1983 | Pepin et al. | 348/169 |
| 4,689,748 | 8/1987 | Hofmann | 701/223 |
| 4,802,757 | 2/1989 | Pleitner et al. | 701/223 |
| 5,054,917 | 10/1991 | Pepin et al. | 356/139.08 |
| 5,071,226 | 12/1991 | Audion et al. | 356/139.05 |
| 5,102,065 | 4/1992 | Couderc et al. | 244/311 |
| 5,270,756 | 12/1993 | Busenberg | 348/144 |
| 5,296,705 | 3/1994 | Pepin et al. | 250/338.1 |
| 5,625,409 | * 4/1997 | Rosier et al. | 348/144 |
| 5,812,190 | 9/1998 | Audier et al. | 348/295 |

FOREIGN PATENT DOCUMENTS 0 145 249 6/1985 (EP) .
2 427 017 12/1979 (FR) .

* cited by examiner

Primary Examiner—Howard Britton
(74) Attorney, Agent, or Firm—Oblon, Spivak, McClelland, Maier & Neustadt, P.C.

(57) ABSTRACT

A processing device for air/ground reconnaissance using optronic equipment of high performance. A high speed detection matrix and a particular electronic processing of video signals is used to reconstruct a scan image from elementary images which have a high degree of overlap and are offset due to scan residual. For example, an incident light beam is projected in the direction of a line of sight through an optical system. Video signals are transmitted to a digital circuit to supply luminance values of successive elementary images to two image memories. A correlation processor delivers an offset signal for the current image to an image reconstruction processor which also receives luminance values for the current images. An image patch memory is reconstructed in which the elementary images are realigned.

20 Claims, 4 Drawing Sheets

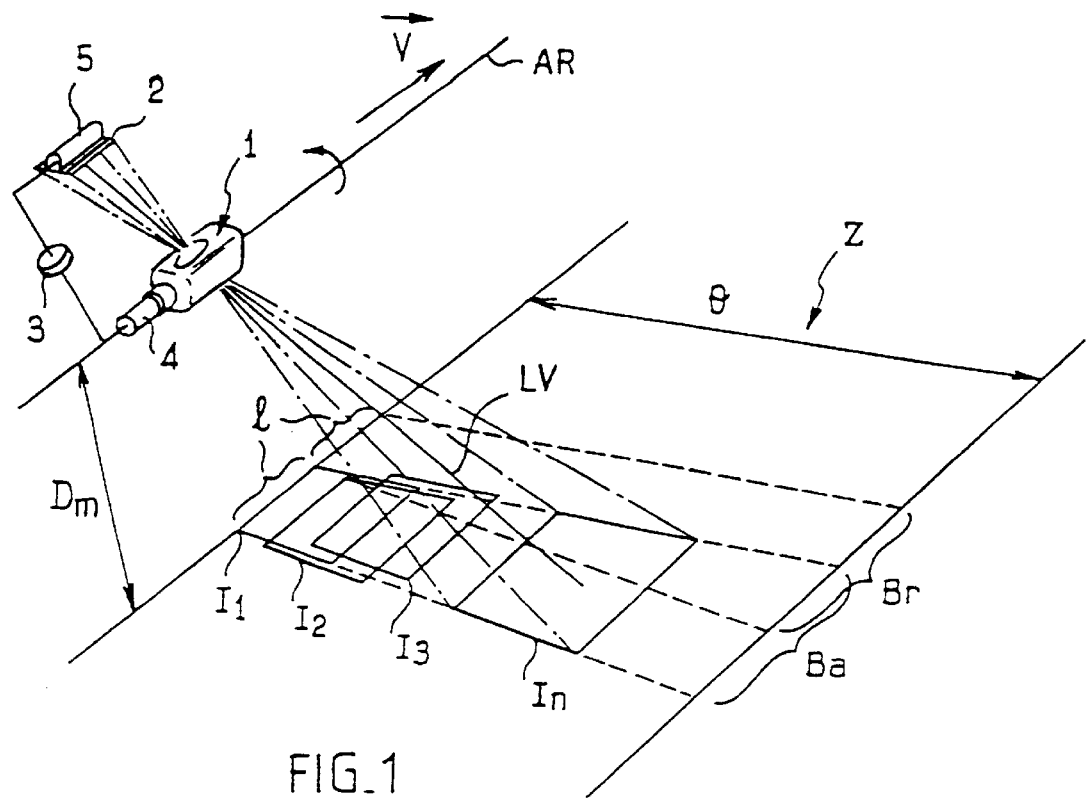
FIG_1
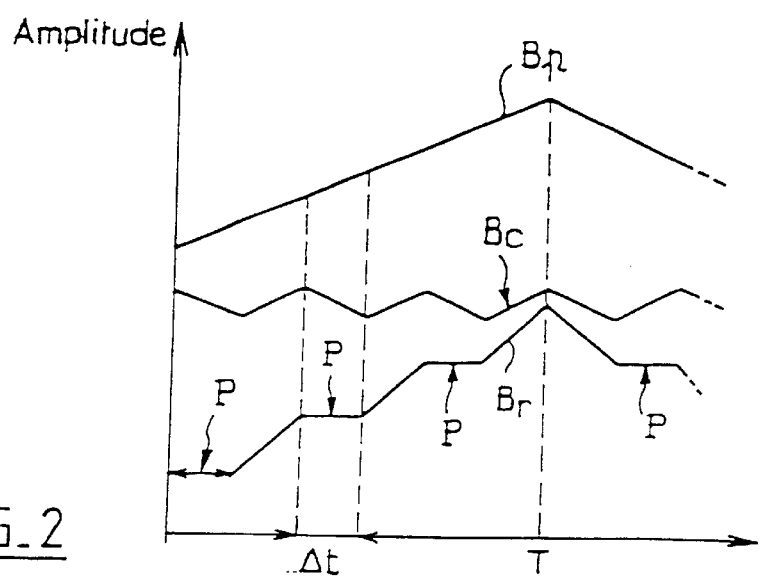
FIG_2

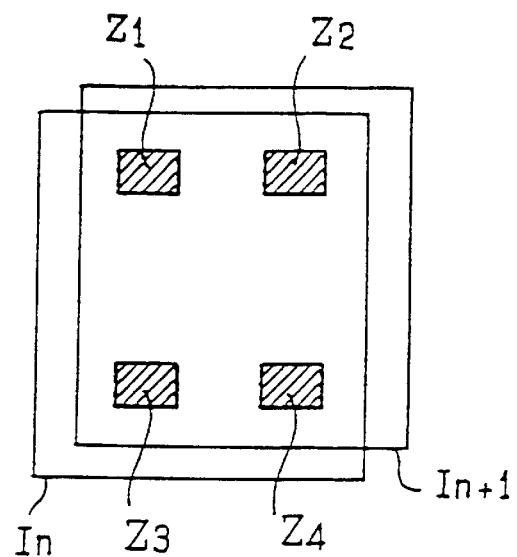
FIG_3
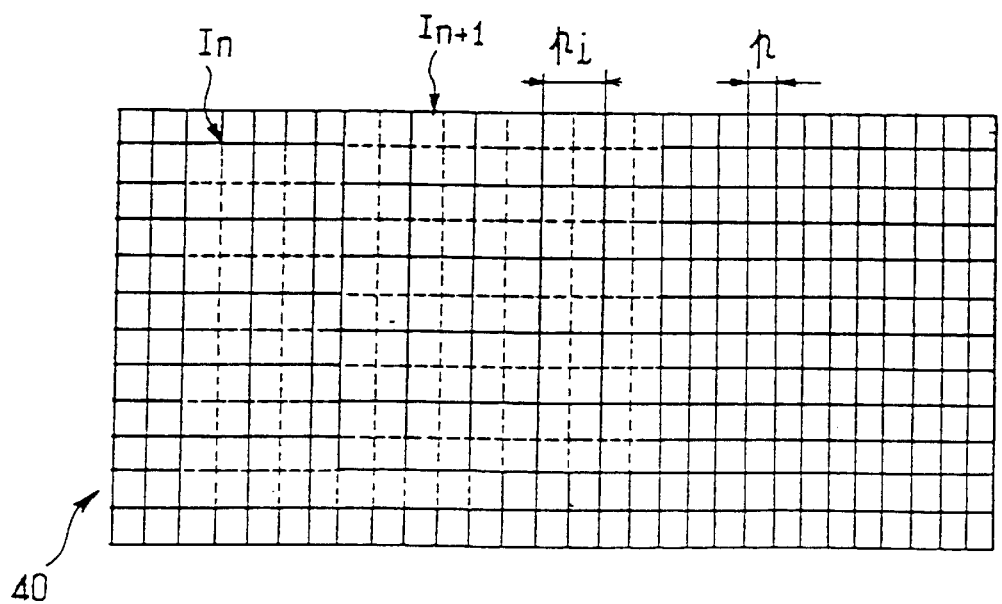
FIG_4

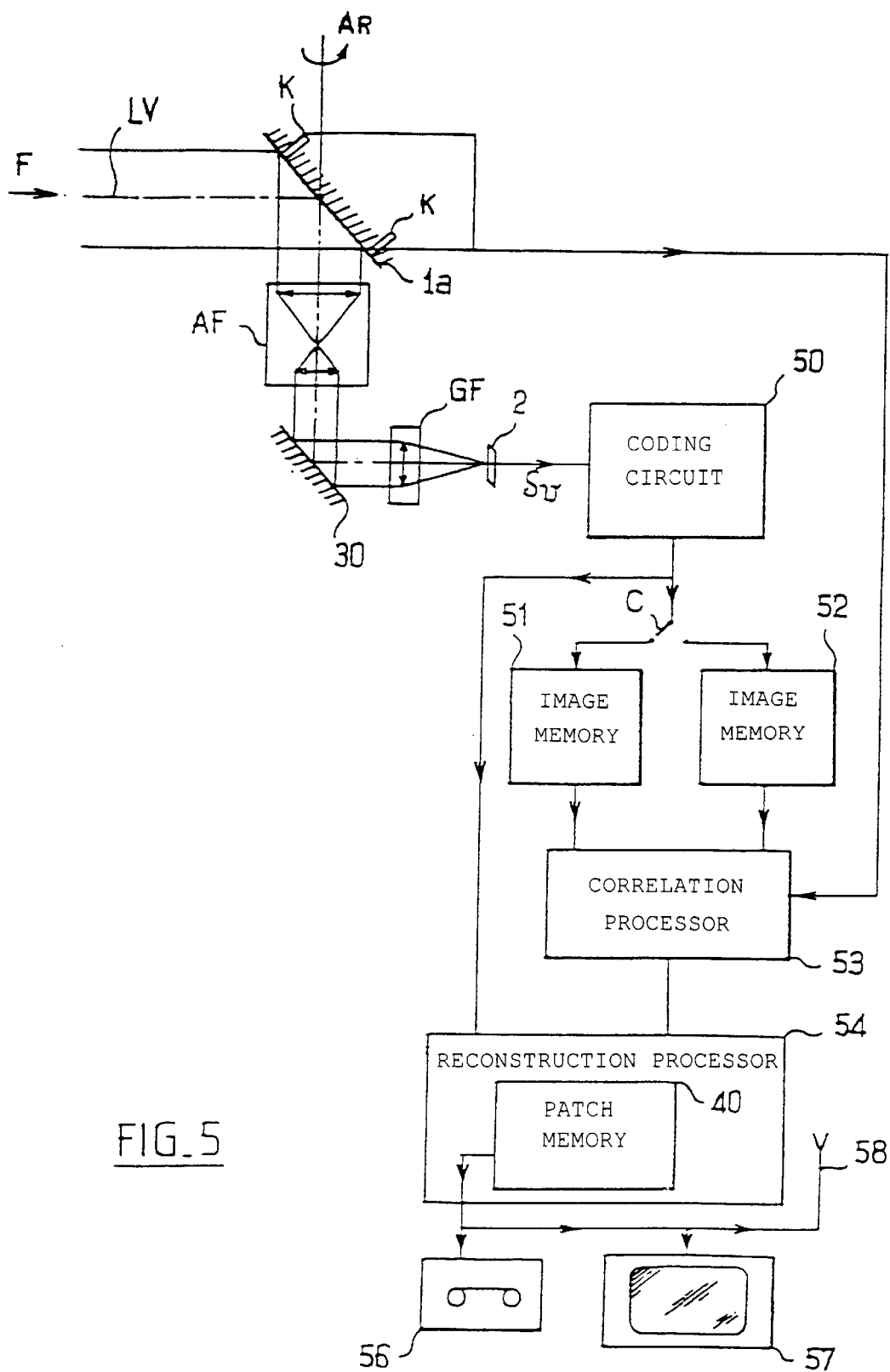
FIG_5

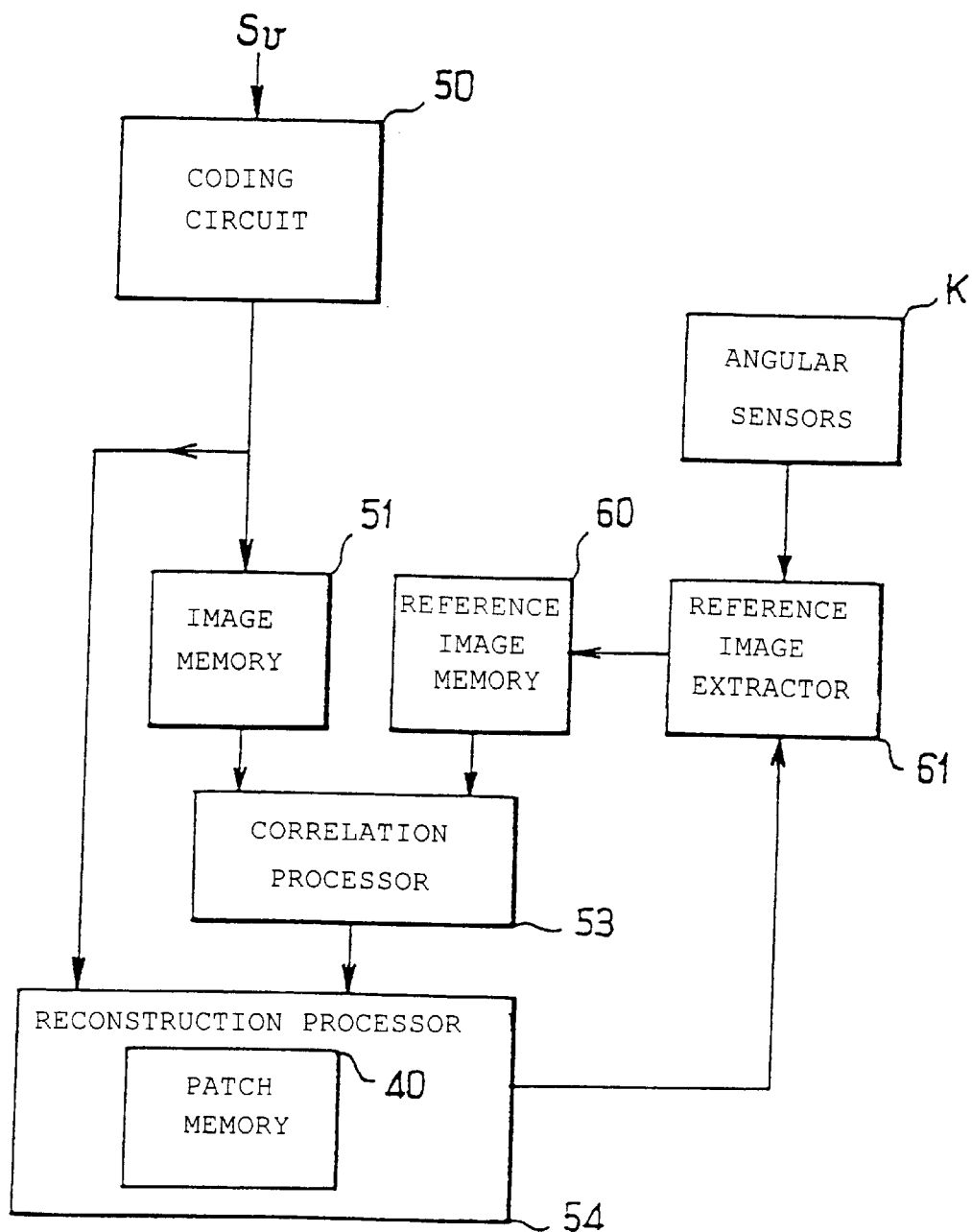
FIG_6

METHOD AND DEVICE FOR AIR-GROUND RECOGNITION FOR OPTOELECTRONIC EQUIPMENT

BACKGROUND OF THE INVENTION

Field of the Invention

The invention relates to the field of day/night reconnaissance, and more particularly to air/ground reconnaissance carried out by airborne optronic equipment. The invention applies in particular to the taking of satellite/ground snapshots or reconnaissance.

DISCUSSION OF THE BACKGROUND

Currently existing airborne reconnaissance equipment is based on the use of a photosensitive photographic film in equipment of very high focal length, or else on the use of a linear array of elementary electronic sensors read by charge transfer CCD (initials of "Charge Coupled Device") or by CMOS circuit (initials of "Complementary Metal Oxide Semiconductor"). The latter technique is integrated into optronic equipment. Only this type of equipment allows high-resolution day/night reconnaissance.

Since sighting is carried out sideways with respect to the displacement of the carrier, the analysis of the image is performed conventionally according to two modes:

in so-called "push-broom" mode: in the case of optronic equipment, the linear array is oriented in such a way that the main axis of its image on the ground is substantially perpendicular to the velocity vector of the carrier aircraft. Thus, it is the displacement of the aeroplane which performs the scanning of the image of the linear array of detectors;

in so-called panoramic mode: the image of the linear array on the ground, projected parallel to the velocity vector of the aeroplane, is scanned sideways by rotating the line of sight of the equipment about an axis parallel to the velocity vector of the aeroplane; the scanning means usually consist of a movable mirror serving also in the stabilizing of the line of sight by virtue of gyroscopic slaving loops. They may also consist of a "two-axis" platform carrying all the equipment.

Comparison of these two modes leads to the following pros and cons.

The "push-broom" mode is simpler to implement and supplies a directly exploitable image; however, it is more exposed to the defects in stabilization of the line of sight which tend to be larger in this mode.

Moreover, the output signals from a detection linear array are conventionally processed by post-integration, for example by so-called TDI or Time and Delay Integration technology, which makes it possible to increase the sensitivity of the linear array electronically both in visible light by day and in infrared so as to operate at night. Post-integration raises difficulties of exploitation in "push-broom" mode owing to the fact that, since the snapshot cannot usually be taken vertically, the inclined projection of the linear array and of its elementary sensors on the ground has variable dimension from one extremity of the linear array to the other.

For its part, the panoramic mode leads to an exploitation of the image which is more complex since the latter is formed of trapeziums which, being obtained by integration in the course of outward and return scans, partially overlap one another. Motorization of the line of sight of the equipment is then required in order to perform this scanning in addition to stabilization. However, the use of a TDI technology detector is compatible with this mode of analysis.

In both these modes, the defects engendered by the stabilization dynamics, and referred to hereafter as the "stabilization residuals", manifest themselves as losses of optical resolution and as geometric defects in the image which may make it unexploitable.

More recently, two-dimensional matrix detectors have been used instead of linear arrays. The mode of analysis implemented with this type of detector then consists in covering the area observed by a scan of the panoramic type, with the aid of several successive exposures. Marginal overlapping of the snapshots conventionally allows electronic realignment of the images obtained.

This solution demands that the line of sight be immobilized successively over each position during the time of exposure of the matrix (typically 10 ms). High performance with regard to the quality of stabilization of the line of sights is therefore necessary. Such performance is difficult to achieve and maintain.

Moreover, capturing an entire image, through successive exposures of the matrix detector, does not make it possible to obtain better than the spatial resolution demanded by the sampling of the sensor. It is not, in effect, possible to carry out interlacing and hence to comply with Shannon's sampling criterion.

SUMMARY OF THE INVENTION

The invention proposes the use of detector matrices in aerial reconnaissance together with a particular mode of analysis which makes it possible to avoid the above drawbacks, in particular the image defects due to stabilization and to sampling.

To this end, the invention optimally exploits the simultaneous availability of a large number of sensors, through the use of a detection matrix in quasi-continuous panoramic scan mode, together with multiple and particularly fast snapshot capture. The optimal approach then consists in carrying out image reconstruction, using the stabilization residual to perform an oversampling of the image, and thus to improve the resolution of the equipment. Thus, the proposed solution identifies and uses to its advantage a drawback of the prior art, namely the scanning residual, to alleviate the optical defects arising from this scanning residual.

More precisely, the subject of the invention is an air/ground reconnaissance process for optronic equipment fitted with a high-speed detection matrix having elementary sensors which are sensitive in the infrared spectrum and supply values of luminance of an observation area on the ground by panoramic scanning of the area in outward and return patches, characterized in that it consists in performing a two-dimensional correlation of elementary image offset by pinpointing areas of overlap of like luminance level in successive elementary images supplied by a panoramic scanning of this matrix, in storing these elementary-image correlations in succession, and in positioning the luminance values of each correlated elementary image in a memory for a reconstructed image patch, the patch memory possessing an elementary memory spacing equal to a fraction of the image-point spacing of each elementary image.

According to a particular embodiment, the number of overlap areas is at least equal to 4, the elementary memory spacing of the patch memory is equal to half the image-point spacing of each elementary image, and the luminance values addressed to one and the same area of the patch memory are accumulated by successive summation.

The invention also relates to a device for implementing this process. This device is based on the use of a so-called "fast" detector matrix, that is to say one with a high reading speed, for example 400 Hz, to form elementary images with a high overlap factor.

According to particular embodiments, there is provided a stabilizing device for maintaining the elementary images of the detector perpendicularly to the path of the aircraft, an apparatus for performing a compensation scan making it possible to obtain immobility of the global scan during the exposure times, two image memories for integrating the luminance values of two successive elementary images, or else a single current image memory associated with a reference image memory. In the latter case, the luminance values of the reference image are obtained by particular processing on a set of values obtained in the course of the scan.

BRIEF DESCRIPTION OF THE DRAWINGS

Other characteristics and advantages of the invention will emerge from the detailed description which follows in conjunction with the appended figures which represent, respectively:

FIG. 1, the principle of implementation of a scan of panoramic type applicable within the context of the invention;

FIG. 2, the line of sight scanning curves obtained in the case of an amalgamation of the main scan and a compensating scan;

FIG. 3, an example of a two-dimensional correlation between two successive elementary images, implemented by the process according to the invention;

FIG. 4, an image patch memory according to the process of the invention;

FIG. 5, an embodying device according to the invention in the form of a schematic diagram;

FIG. 6, a variant embodiment of the device according to the invention.

DETAILED DESCRIPTION OF THE PREFERRED EMBODIMENTS

Certain currently available infrared matrices make use of a register for reading at very high output speed, equal for example to 400 Hz. Within the context of the invention and with the help of a matrix of this type, successive high-speed exposures can be performed in the course of a panoramic scan within the context of the invention, such as illustrated in FIG. 1 by an example embodiment.

Such a scan is performed by oscillation of a scanning mirror of an optical assembly 1 about the roll axis AR of the aircraft, parallel to the rate of displacement vector V of this aircraft. The scan is performed at constant angular rate with respect to an absolute frame and makes it possible to scan an area Z on the ground. The optical assembly 1 comprises an optical system which projects the image of the detection matrix 2 onto the area Z to be observed. The extreme rays of this projection are indicated chain-dotted, the line of sight LV corresponding to the central ray of the image.

A device 3 for stabilizing the line of sight LV slaves the position of the scanning mirror along two orthogonal axes. To obtain a constant angular rate of scan, the stabilizing device 3 transmits a line of sight control signal to the mirror drive motor 4 so as to maintain the output signal from a rate gyro 5 fixed on the matrix 2 constant.

Advantageously, the line of sight LV is also controlled transversely so as to compensate for the forward motion of the aircraft during each outward $B_a$ or return $B_r$ scan, these being indicated by dashes in FIG. 1. The ground trace of the elementary images $I_1$, $I_2$, $I_3$, . . . $I_n$ formed during the successive snapshot exposures is thus slaved so as to remain perpendicular to the path of the aircraft.

Preferably, the exposure time during which the elementary sensors of the detection matrix are exposed in the form of image-points so as to form an elementary image, is synchronous for all the image-points. In this way, the geometry of the successive elementary images obtained through the movement of the line of sight is preserved. This exposure time is also small enough not to reduce the resolution of the image, owing to the displacement of the latter during the time of integration of the charges of the elementary sensors released during exposure. This exposure time is for example such that the corresponding displacement of an image does not exceed a fraction, advantageously between a quarter and a third, of an image-point.

However, the scan rate, calculated so that no blind areas appear between the outward and return scan patches, $B_a$ and $B_r$, remains high. Under these conditions, a compensating scan, making it possible to obtain immobility of the global scan during the exposure times, can advantageously be used within the scope of the invention.

The following digital example is indicative. To comply with the condition of no blind area, it is sufficient for the displacement of the carrier aircraft between the start of the output scan and the start of the return scan to be less than or equal to the width of the patches "I" at the minimum observation distance $D_m$. Taking into account the scanning efficiency ρ owing to the reversing of the line of sight between the outward and return scan, and the angular length θ of the patches, a simple calculation shows that the scan rate v is related to the velocity V of the aeroplane by the relation:

$$v = \frac{\theta}{1 \cdot \rho} V$$

In the case of a matrix of 240×320 sensors of 30+30 $\mu m^2$, of an optical system of focal length equal to 1 m, projecting an elementary image of dimensions 9.6 $10^{-3}$×7.2 $10^{-3}$ $rd^2$ at a minimum distance $D_m$ equal to 15 km, with an aeroplane velocity equal to 300 m/s, an angular length of patch of 6 degrees, i.e. 100 milliradians, and a scan efficiency of 0.8, the scan rate is equal to 0.26 rd/s. If the reading speed of the matrix is 400 Hz, with a duration of charge integration equal to 1.25 ms, the displacement of the line of sight over this duration of integration is nearly 10 times greater than the dimension of the image-point.

Under these conditions, it is useful to slow down the apparent velocity of the line of sight during the exposure time, by inserting an additional apparatus, a mirror or a plate, into the optical system so as to perform a compensating scan in the opposite direction to the main scan.

FIG. 2 indicates the curves of angular amplitude as a function of time t, of the main scan $B_p$ of the line of sight of half-period T, of a compensating scan $B_c$, and of the scan $B_r$ resulting from the coupling of the above two scans. The compensating scan $B_c$ is, in this illustrative embodiment, of sawtooth type. It exhibits a falling edge whose slope and duration are such that the porches P which appear on the resulting scan $B_r$, through addition of the scans during their opposed phase, correspond to the exposure time Δt. During the main scan return, the slopes of the curves $B_p$ and $B_r$ are reversed. The durations of the rising and falling edges of the compensating scan can be adapted as a function of the exposure times and of the duration of integration of the charge of the elementary sensors.

According to the invention, the elementary images, obtained during an outward or return scan, are processed so as to reconstruct a final image in the form of a rectilinear patch. For example, going back to the earlier digital application, an outward or return scan forms 154 elementary images in a 6° angular length patch to be reconstructed, each point of the ground of the observation area being displayed on 11 different elementary images.

The reconstruction of an image from these elementary images takes account of the amalgamation between the main scan movement and the random movements due to the stabilization residuals. The process according to the invention uses these residuals by determining their effect through successive correlations, these correlations then being exploited so as to reconstruct the image and improve the sampling thereof.

Firstly, a two-dimensional correlation is performed between two successive elementary images, as is illustrated in FIG. 3 by a non-limiting example. In this example embodiment, four correlation areas, Z1, Z2, Z3 and Z4, are used. These correlation areas are chosen inside the area of overlap of two successive elementary images, $I_n$ and $I_{n+1}$. It is useful to define the correlation areas inside the overlap area with a sufficient margin, in view of the stabilization residual of the images. The use of at least four correlation areas advantageously makes it possible to determine any rotations between successive elementary images.

The correlation calculation, performed with the help of a processor associated with an elementary image memory, determines the displacement of the elementary image $I_{n+1}$ with respect to the previous image $I_n$ or with respect to a reference image. The calculation pinpoints the overlap areas of like luminance level in each elementary image to be correlated. The variation in the pinpointing of these overlap areas determines the relative displacement of the successive elementary images.

The determination of this displacement then allows spatial realignment of the image-points in a memory for a reconstructed image patch. The greater the overlap factor between successive elementary images, the more accurate the determination of the displacement.

Such a patch memory is depicted in FIG. 4. To benefit from the effect of oversampling the image when a high-speed matrix is used, the patch memory 40 possesses an elementary memory spacing p equal to a fraction of the image-point spacing $p_i$ of each elementary image $I_n$ or $I_{n+1}$, for example equal to half thereof. The luminance values contained in succession in the elementary image memory, which are proportional to the luminous intensity received by the elementary sensors, are transmitted into the elementary areas of the patch memory, while taking account of the offset determined by the correlation processor between elementary images.

This method of reconstruction according to the invention is applied by advantageously involving the image digital processing means, namely:
  interpolation of the image-points of the elementary images, to address the luminance values in the corresponding memory areas of the patch memory,
  anti-aliasing and bidirectional digital filtering,
  accumulation by summation of the luminance values successively integrated in each area of the patch memory.

By dint of this latter operation, a substantial improvement is apparent in the signal-to-noise ratio, manifesting the benefit derived from exploiting the large overlap factor for elementary images such as those used by the invention.

FIG. 5 recalls, in the form of a schematic diagram, the whole of the means implementing the example embodiment of a device according to the invention. The elements already described are represented in this figure with the same reference signs. The line of sight LV is defined on the basis of the oscillation of the stabilizing and main scanning mirror 1a associated with the compensating scanning mirror 30, which is able to move respectively about the roll axis AR of the aircraft and an axis perpendicular to the axis AR. The axis of rotation of the compensating scanning mirror 30 is in the plane of the figure, the rotation of this mirror bringing about that of the line of sight LV about the roll axis AR. The elementary images are formed on the detection matrix 2 by projection of the incident light beam F in the direction of the line of sight LV through an optical group with focal AF (possibly associated with a frontal optical group, not represented) arranged conjugately with an optical focusing group GF. The detection matrix 2 delivers a video signal $S_V$ to a shaping and digital coding circuit 50. This circuit supplies luminance values of an elementary image to an image memory 51, after having supplied the luminance values of the previous elementary image to another image memory 52. A switching gate C makes it possible to integrate the luminance values successively in one or other of the image memories. These luminance values are supplied to the correlation processor 53 which delivers, according to the process described above, an offset signal for the current elementary image with respect to the previous elementary image to the image reconstruction processor 54.

Moreover, the luminance values of the current elementary images emanating from the circuit 50 are applied directly to the images reconstruction processor 54 comprising the images patch memory 40. The images reconstruction processor realigns the elementary images in the image patch memory as a function of the offset values supplied by the correlation processor 53 and of the luminance values supplied by the circuit 50. Having exited the image patch memory 40, the signals are delivered so as to be recorded in digital form in a recording device 56, or displayed on a monitor 57 of compatible standard, or else transmitted by an antenna 58 to a station situated on the ground.

A sequencer (not represented) conventionally manages the times of synchronous exposure of the elementary sensors, the charge integration times of these sensors, and the times for integration and passage of the information between the various components of the subsequent processing.

According to a variant embodiment, and so as to limit the volume of the calculations carried out by the correlation processor 53, angular sensors K situated on the main scan stabilizing mirror 1a supply a positioning cue to the correlation processor 53. This processor uses these cues to preposition the current elementary image with respect to the previous image while calculating only the correlation sheet whose dimensions are those of the stabilization residual.

According to another variant illustrated in FIG. 6, the current elementary image is compared with a reference image extracted from the images patch memory 40 on the basis of all the previous elementary images and stored in a reference image memory 60. The reference image is obtained by extracting mean values of luminance from the patch memory, and these values are integrated in an extractor 61. The integrated values in the reference images memory 60 are then obtained together with a position supplied by the angular sensors K. More accurate correlation values are thus obtained since the reference image profits from the oversampling supplied by the previous elementary images.

The invention is not limited to the example embodiments described and represented. It is for example possible to use a single central processor of suitable power to perform the correlation and the reconstruction of images. It is also possible to use two gyroscopes, so as to give the digital correlation processing a positioning of the current elementary image, or to use angular sensors which are accurate enough to supply the position of the current elementary image directly. In the latter case, it is then possible to eliminate the correlation processor by transmitting the data directly to the reconstruction processor.

What is claimed is:

1. Air/ground reconnaissance process for optronic equipment fitted with a high-speed detection matrix having elementary sensors which are sensitive in the infrared spectrum and supply values of luminance of an observation area on the ground by panoramic scanning of the area in outward and return patches, characterized in that it consists in performing a two-dimensional correlation of elementary image offset by pinpointing areas of overlap of like luminance level in successive elementary images supplied by a panoramic scanning of this matrix, in storing these elementary-image correlations in succession, and in positioning the luminance values of each correlated elementary image in an images patch memory this patch memory possessing an elementary memory spacing equal to a fraction of the image-point spacing of each elementary image.

2. Air/ground reconnaissance process for optronic equipment according to claim 1, characterized in that the number of overlap areas is at least equal to 4, in that the elementary memory spacing is equal to half the image-point spacing of each elementary image, and in that the luminance values addressed to one and the same area of the patch memory are accumulated by successive summation.

3. Air/ground reconnaissance device for implementing the process according to claim 1 by a panoramic scanning of the area in outward and return patches along a line of sight defined on the basis of the oscillation of a stabilizing and main scanning mirror characterized in that elementary images are formed on the detection matrix by projection of an incident light beam in the direction of the line of sight through an optical system, in that the detection matrix delivers a video signal to a digital circuit so as to supply luminance values of a current elementary image to at least one image memory, in that the luminance values of the elementary image are supplied to a correlation processor which delivers an offset signal for the current elementary image for pinpointing the areas of overlap to an image reconstruction processor to which are also transmitted the luminance values of the current elementary images emanating from the circuit, and in that the reconstruction processor comprises an image patch memory in which the elementary images are positioned as a function of the offset values supplied by the correlation processor and of the luminance values supplied by the circuit, this patch memory possessing an elementary memory spacing equal to a fraction of the image-point spacing of each elementary image.

4. Air/ground reconnaissance device for optronic equipment according to claim 3, characterized in that a device for stabilizing the line of sight slaves the position of the scanning mirror according to two orthogonal axes by maintaining the output signal from a rate gyro fixed on the matrix constant so as to compensate for the forward motion of the aircraft, maintaining the elementary images projected perpendicular to the path of the aircraft.

5. Air/ground reconnaissance device for optronic equipment according to claim 4, characterized in that the main mirror is associated with a compensating scanning mirror, whose effect adds to or opposes that due to this main mirror, the compensating scan having a phase periodically opposed to the main scan during at least a period equal to the snapshot exposure time of each elementary image.

6. Air/ground reconnaissance device for optronic equipment according to claim 5, characterized in that the exposure time during which the elementary sensors of the detection matrix are exposed in the form of image-points so as to form an elementary image, is synchronous for all the image-points.

7. Air/ground reconnaissance device for optronic equipment according to claim 5, characterized in that the luminance values of two successive elementary images are supplied to two image memories, these luminance values next being transmitted to the correlation processor so as to determine the offset of one elementary image with respect to the previous elementary image.

8. Air/ground reconnaissance device for optronic equipment according to claim 5, characterized in that angular sensors situated on the main scan stabilizing mirror supply a positioning cue to the correlation processor so as to preposition the current elementary image with respect to the previous image while calculating only the correlation sheet of dimension corresponding to that of the stabilization residual.

9. Air/ground reconnaissance device for optronic equipment according to claim 5, characterized in that the current elementary image is compared with a reference image extracted from the patch memory by averaging of the luminance values of all the previous elementary images and storage in a reference image after having been integrated in an extractor which also receives an approximate positioning cue supplied by angular sensors situated on the main scan stabilizing mirror.

10. Air/ground reconnaissance device for optronic equipment according to claim 3, characterized in that the sensors are sufficiently accurate to supply the position of the current elementary image directly to the reconstruction processor without passing through the correlation processor.

11. Air/ground reconnaissance device for optronic equipment according to claim 1, characterized in that the image patch memory deliver signals which are recorded in digital form in a recording device, are displayed on a monitor of compatible standard, or are transmitted by an antenna to a station situated on the ground.

12. Air/ground reconnaissance device for implementing the process according to claim 2, by a panoramic scanning of the area in outward and return patches along a line of sight defined on the basis of the oscillation of a stabilizing and main scanning mirror, characterized in that elementary images are formed on the detection matrix by projection of an incident light beam in the direction of the line of sight through an optical system, in that the detection matrix delivers a video signal to a digital circuit so as to supply luminance values of a current elementary range, to at least one image memory, in that the luminance values of the elementary image are supplied to a correlation processor which delivers an offset signal for the current elementary image for pinpointing the areas of overlap to an image reconstruction processor to which are also transmitted the luminance values of the current elementary images emanating from the circuit, and in that the reconstruction processor comprises an image patch memory in which the elementary images are positioned as a function of the offset values supplied by the correlation processor and of the luminance values supplied by the circuit, this patch memory possessing an elementary memory spacing equal to a fraction of the image-point spacing of each elementary image.

13. Air/ground reconnaissance device for optronic equipment according to claim 2, characterized in that the image patch memory deliver signals which are recorded in digital form in a recording device, are displayed on a monitor of compatible standard, or are transmitted by an antenna to a station situated on the ground.

14. Air/ground reconnaissance device for optronic equipment according to claim 3, characterized in that the image patch memory deliver signals which are recorded in digital form in a recording device, are displayed on a monitor of compatible standard, or are transmitted by an antenna to a station situated on the ground.

15. Air/ground reconnaissance device for optronic equipment according to claim 4, characterized in that the image patch memory deliver signal which are recorded in digital form in a recording device, are displayed on a monitor of compatible standard, or are transmitted by an antenna to a station situated on the ground.

16. Air/ground reconnaissance device for optronic equipment according to claim 5, characterized in that the image patch memory deliver signals which are recorded in digital form in a recording device, are displayed on a monitor of compatible standard, or are transmitted by an antenna to a station situated on the ground.

17. Air/ground reconnaissance device for optronic equipment according to claim 6, characterized in that the image patch memory deliver signals which are recorded in digital form in a recording device, are displayed on a monitor of compatible standard, or are transmitted by an antenna to a station situated on the ground.

18. Air/ground reconnaissance device for optronic equipment according to claim 7, characterized in that the image patch memory deliver signals which are recorded in digital form in a recording device, are displayed on a monitor of compatible standard, or are transmitted by an antenna to a station situated on the ground.

19. Air/ground reconnaissance device for optronic equipment according to claim 8, characterized in that the image patch memory deliver signals which are recorded in digital form in a recording device, are displayed on a monitor of compatible standard, or are transmitted by an antenna to a station situated on the ground.

20. Air/ground reconnaissance device for optronic equipment according to claim 9, characterized in that the image patch memory deliver signals which are recorded in digital form in a recording device, are displayed on a monitor of compatible standard, or are transmitted by an antenna to a station situated on the ground.

\* \* \* \* \*